United States Patent [19]

Inagaki et al.

[11] 4,336,926
[45] Jun. 29, 1982

[54] WORKPIECE MANIPULATOR

[75] Inventors: Shigemi Inagaki; Ryo Nihei, both of Musashino, Japan

[73] Assignee: Fujitsu Fanuc Limited, Tokyo, Japan

[21] Appl. No.: 162,879

[22] Filed: Jun. 25, 1980

[30] Foreign Application Priority Data

Jun. 30, 1979 [JP] Japan ................................ 54-082780

[51] Int. Cl.³ ............................................. B23Q 3/08
[52] U.S. Cl. ...................................... 269/34; 269/218; 269/253; 269/71; 414/741
[58] Field of Search .................... 269/27, 32, 34, 218, 269/253, 108, 111; 279/1 L, 66; 414/741; 294/86 R, 88, 81 R

[56] References Cited

U.S. PATENT DOCUMENTS

| 210,473 | 12/1878 | Solomon | 269/253 |
| 1,189,004 | 6/1916 | Scotford | 269/218 X |
| 1,246,557 | 11/1917 | Crowder | 269/108 X |
| 1,349,330 | 8/1920 | Ditson | 269/32 X |
| 1,736,363 | 11/1929 | Ramsden | 269/34 X |
| 1,738,504 | 12/1929 | Stevens | 269/34 X |

FOREIGN PATENT DOCUMENTS 934778  8/1963  United Kingdom ................ 414/741

Primary Examiner—Robert C. Watson
Attorney, Agent, or Firm—Staas & Halsey

[57] ABSTRACT

A manipulator corresponding to the human hand is generally attached to the end of an arm of an industrial robot or remote control apparatus. The improved manipulator herein includes two spaced-apart, rotatable sprockets and a chain which is connected in the form of an endless loop and stretched between the sockets to form two parallel linear segments which move in mutually opposing directions when the chain is rotated. Two fingers for gripping a workpiece are arranged to move in a direction which is parallel to the linear segments by means of guide members, one finger being coupled to one of the linear segments of the chain and the other finger being coupled to the other linear segment. A cylinder is provided for accommodating a piston having piston rods secured to either side thereof. The other ends of the piston rods pass hermetically through both side walls of the cylinder and are secured in blocks located outside the cylinder, the blocks forming the walls of the manipulator. The cylinder is coupled to one of the linear portions of the chain. Introducing a fluid such as compressed air into the cylinder from one side thereof and permitting the fluid to escape from the other side thereof causes the cylinder to be driven along the piston rods, whereby the chain which is coupled to the cylinder is rotated so as to move the fingers together or separate them from each other, allowing a workpiece to be gripped or released. Since the two linear portions of the chain move by equivalent absolute amounts in mutually opposing directions, the fingers can always be made to come together at the exact gripping center of the device through a very simple construction.

5 Claims, 5 Drawing Figures

WORKPIECE MANIPULATOR

BACKGROUND OF THE INVENTION

This invention relates to a workpiece manipulator which can be applied to the hand of a robot, and more particularly to a workpiece manipulator which has two fingers and which is adapted such that the point toward which the fingers approach in gripping a workpiece will always be at the same fixed position located exactly midway between the fingers.

Industrial robots are equipped with a hand for carrying a workpiece to a prescribed location. For this purpose a workpiece manipulator having fingers for gripping the workpiece is provided at the end of the hand. In repeatedly gripping and carrying a number of workpieces of the same diameter it is possible to stabilize the gripping operation by arranging it such that the fingers of the workpiece manipulator approach the same fixed position midway between the fingers each time a workpiece is gripped. In general this is accomplished by connecting the fingers of the manipulator such that they will be displaced mechanically by equivalent amounts. For example, one such method makes use of a screw rod which is threaded from the center thereof in opposing directions, that is, to the left and right. Drive portions for each of the fingers are engaged with respective ones of the oppositely directed threaded portions of the rod so that, when the rod is rotated, the two fingers are caused to approach or separate from each other thereby to grip or release a workpiece. However, one disadvantage encountered with this method is the high cost necessitated by the fairly complex mechanism that transmits the rotating motion to the screw rod.

Another method which offers a simpler construction proposes the use of a pantagraph-type lever mechanism. In this case, however, it is difficult to make the fingers approach the same fixed position for each operation thereof because of play or backlash which develops in the connecting portion between levers.

BRIEF SUMMARY OF THE INVENTION

Accordingly, it is an object of the present invention to provide a workpiece manipulator which is simply constructed and which permits a workpiece to the gripped and released stably by means of an arrangement wherein a pair of fingers are made to approach the same position midway there between at all times.

It is another object of the present invention to provide a workpiece manipulator wherein a portion having members that cover equal absolute distances in travelling in mutually opposing directions is realized by providing a ring-shaped member such as a belt and by rotating the ring-shaped member, which portion is utilized to drive the fingers of the manipulator.

It is still another object of the present invention to provide a workpiece manipulator which permits a pair of fingers to be brought together or separated from each other by rotating a ring-shaped member such as a belt.

It is a further object of the present invention to provide a workpiece manipulator which employs a drive mechanism comprising a cylinder and a piston that moves within the cylinder, the fingers of the manipulator being driven by an arrangement wherein the piston is held fixed and the cylinder is movable and connected to a ring-shaped belt member.

According to the present invention, there is provided a workpiece manipulator which grips or releases a workpiece by causing a pair of fingers to approach or separate from each other. In accordance with characteristic structure thereof, a ring-shaped member such as a belt is stretched between a pair of rotatable pulley members which are spaced apart from one another. One of the fingers is coupled to one linear segment of the ring-shaped member, such as a belt, and the other finger is coupled to the other linear segment of the belt.

Other features and advantages of the present invention will be apparent from the following description taken in connection with the accompanying drawings.

DETAILED DESCRIPTION OF THE PREFERRED EMBODIMENT

Figure 1:
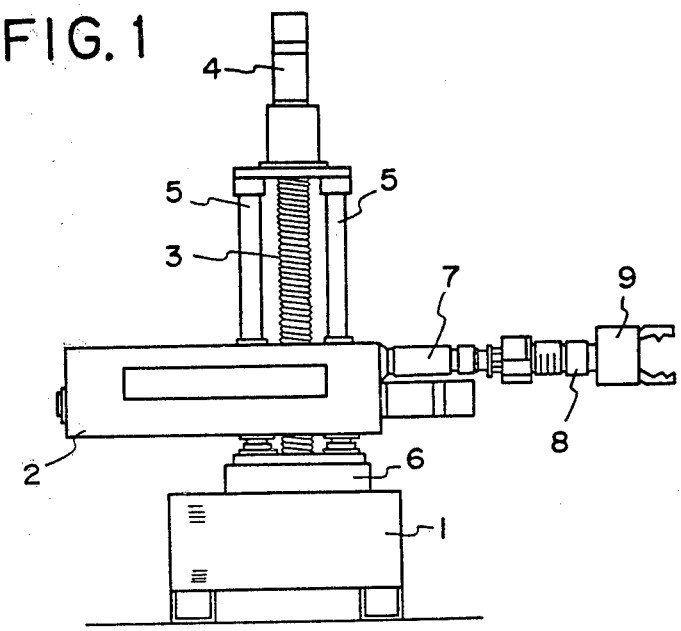
FIG. 1 is a front view showing the construction of an industrial robot to which is attached a workpiece manipulator in accordance with the present invention.

Referring first to FIG. 1, there is shown a front view of an industrial robot equipped with a workpiece manipulator in accordance with the present invention. The arrangement includes a base 1, a robot body 2, a screw rod 3 adapted to move the robot body 2 vertically, a motor 4 for rotating the screw rod 3, guide rods 5 for guiding the robot body 2 as it is moved vertically by the screw rod, a rotatable pedestal 6 for rotating the robot body 2, an arm 7 which can be extended or retracted longitudinally thereof, a wrist mechanism 8, and a workpiece manipulator 9 which is twisted by the wrist mechanism 8.

Figure 2:
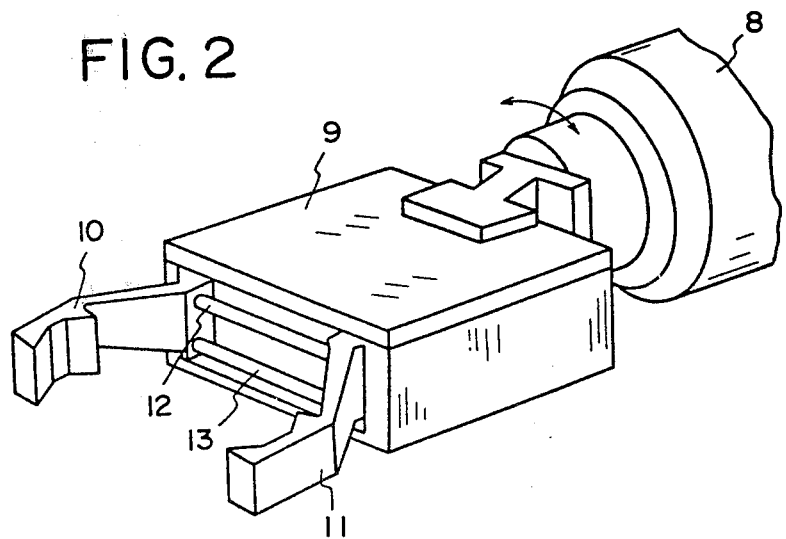
FIG. 2 is a perspective view of a workpiece manipulator in accordance with the present invention.

With reference to FIG. 2, two fingers 10, 11 are attached to the free end of the workpiece manipulator 9 and the fingers are guided along two guide rods 12, 13 so as to approach or separate from each other to permit a workpiece to be gripped or released.

Figure 3:
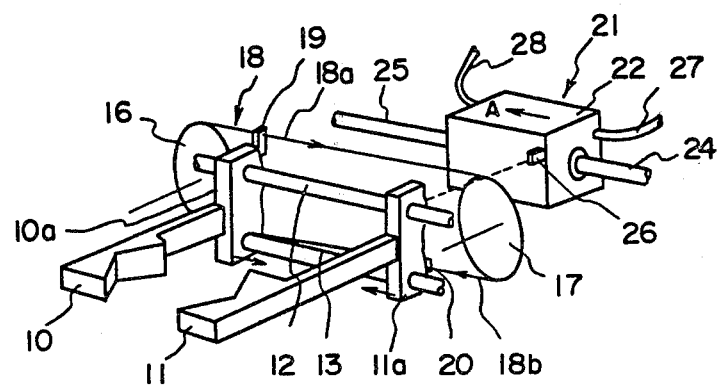
FIG. 3 is a basic perspective view showing the internal mechanism of the workpiece manipulator of the present invention.
Figure 4:
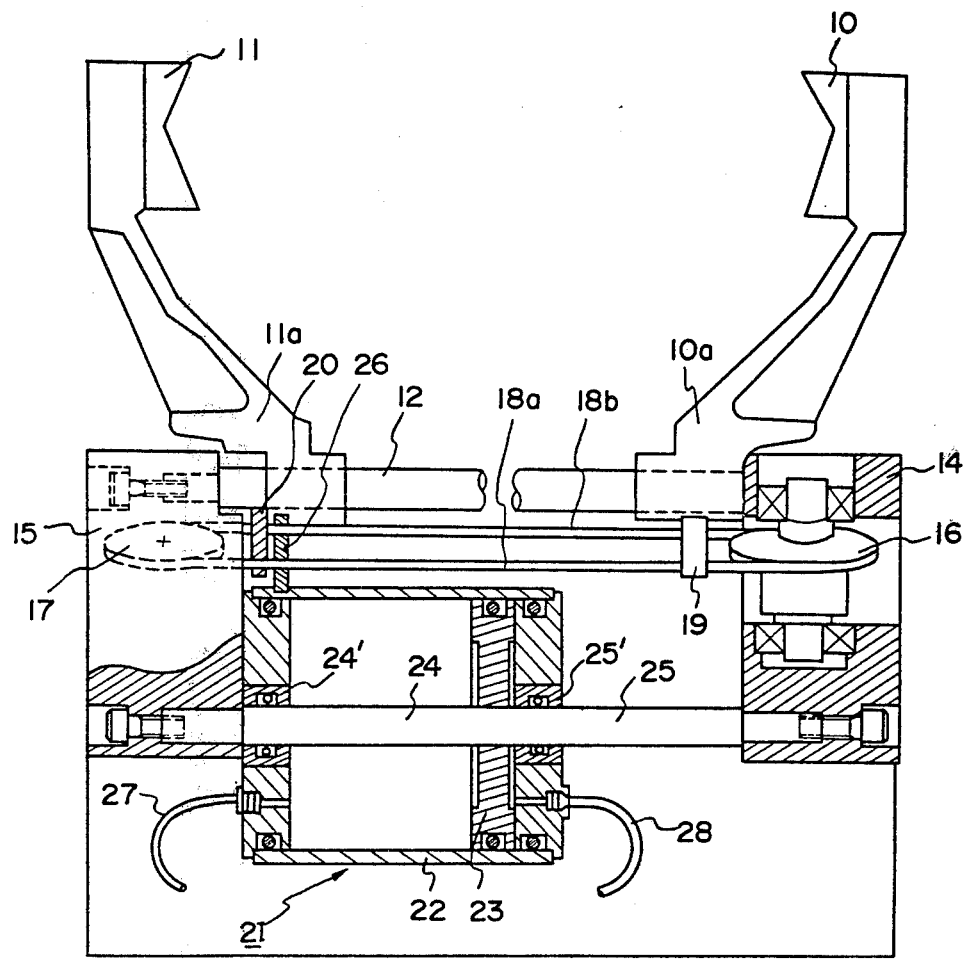
FIG. 4 is a top view showing the interior of the workpiece manipulator.

The internal mechanism of the workpiece gripping device is shown in the perspective view of FIG. 3, and FIG. 4 shows a top view of the same with a portion cut away. In FIG. 4, the ends of the guide rods 12, 13 are fixedly secured in blocks 14, 15. Located in back of the guide rods 12, 13 at each end thereof are sprockets 16, 17 which are axially supported by the blocks 14, 15. Stretched between the two sprockets 16, 17 is a chain 18 comprising chains 18a, 18b connected in the form of a ring or endless loop to form linear segments which lie in parallel. A coupling member 19 is fixed at one end to the chain 18a at the linear segment thereof which is located above the sprockets, and at the other end thereof to a base plate 10a formed on the finger 10. Another coupling member 20 is fixed at one end to the chain 18b at the linear segment thereof which is located below the sprockets, and at the other end to a base plate 11a formed on the finger 11.

Disposed in back of the sprockets 16, 17 is a finger drive mechanism 21 which comprises a piston 23 and cylinder 22. More specifically, the cylinder 22 accommodates a piston 23 having piston rods 24, 25 attached to respective sides thereof, one of the rods passing through the piston, as shown in FIG. 4. However, it is also possible to fix a single rod to the piston and extend the rod through the piston. The piston rods 24, 25 pass hermetically through piston head bearings 24', 25' which are provided in the respective end walls of the cylinder 22, and the ends of the piston rods are secured to the blocks 14, 15. Thus it should be noted that the piston 23 is fixed to the stationary piston rods 24, 25, but that the cylinder 22 is free to slide along the piston rods by virtue of the bearings 24', 25'. The side wall of the cylinder 22 is coupled to the base plate 11a of the finger 11 by means of the coupling member 26, and the end walls of the cylinder have respective flexible pipes 27, 28 attached thereto for the purpose of introducing air into the cylinder.

The manipulator having the foregoing construction operates in the following manner. First, it should be noted that the fingers 10, 11 are shown in the separated state in FIGS. 3 and 4, and that the cylinder 22 is located on the left side of FIG. 4. If air is now introduced into cylinder 22 on the right-hand side of piston 23 from pipe 28, and a solenoid valve, which is connected to the pipe 27 and which will be described later, is opened, the air which has until now been stored within the cylinder 22 on the opposite side of the piston 23 will be allowed to escape through the pipe 27. This will cause the cylinder 22 to be displaced toward the right side of FIG. 4, or in the direction of the arrow A in FIG. 3. Since the chain 18b is coupled to the cylinder 22 through the coupling member 26 as described above, the chain 18b will move toward the left in FIG. 3, and chain 18a will move toward the right. Accordingly, the fingers 10, 11 which are connected to the chains 18a, 18b will move inwardly, namely toward each other, by exactly the same distance, and will meet at a point lying exactly midway between them, when the cylinder 22 has been shifted to the righthand side of FIG. 4 to the fullest possible extent.

To separate the fingers from each other the foregoing operation is reversed. In other words, introducing air into cylinder 22 from pipe 27 and discharging the air through pipe 28 will return the cylinder to the state shown in FIG. 4, thereby causing the fingers 10, 11 to move toward the left and right and separate from each other.

Figure 5:
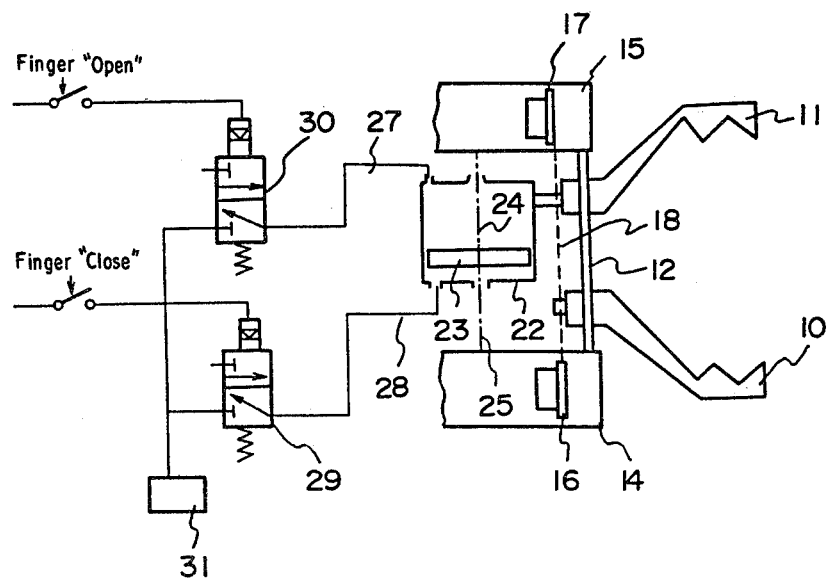
FIG. 5 is a diagram of a control circuit for the workpiece manipulator.

The circuit for controlling the manipulator of the present invention is illustrated in FIG. 5. The circuit includes a solenoid valve 29 which causes the fingers to grip a workpiece, a solenoid valve 30 which causes the fingers to release a workpiece, and a solenoid valve 31 for controlling the discharge of air. The valves 29 and 30 are three-port valves.

While the foregoing embodiment has been described and illustrated with respect to an arrangement in which the fingers are driven by a chain which is stretched between the two sprockets in the form of a ring or endless loop, it is also possible to employ a structure where a steel wire or a timing belt is connected in the form of a ring or endless loop and stretched between pulleys. It is also obvious that the manipulator of the present invention can be applied not only to industrial robots but also to other arrangements such as the manipulator of a remote control apparatus which is used in handling biologically hazardous materials.

The workpiece manipulator of the present invention having the construction described above drives the fingers 10, 11 by the arrangement wherein the piston 23 is supported against movement and hence stationary, whereas the cylinder 22 is capable of being moved to the right and left. Accordingly, the space required inside the gripping device need not be much greater than the stroke of the cylinder, and can therefore be reduced in comparison with a drive system that adopts a fixed cylinder and a movable piston.

Furthermore, since the chain that drives the fingers is connected in the form of a ring or endless loop, the upper portions of the chain move by equivalent absolute amounts in mutually opposing directions. In consequence, the fingers can always be made to come together at the exact gripping center of the device so that the gripping operation is carried out stably and reliably. Moreover, the finger drive mechanism does not employ an arrangement that relies upon the meshing of gears, thereby providing a more inexpensive manipulator owing to the simpler construction thereof.

It should also be noted that frictional force is greatly diminished in driving the cylinder 22 since the driving force applied thereto is received by the bearings 24', 25' at both piston heads.

As many apparently widely different embodiments of the present invention can be made without departing from the spirit and scope thereof, it is to be understood that the invention is not limited to the specific embodiment thereof except as defined in the appended claims.

What we claim is:

1. A workpiece manipulator, comprising:
   first and second fingers;
   means mounting said first and second fingers for movement toward and away from each other to respectively grip and release said workpiece;
   two spaced-apart, rotatable pulley members;
   a belt member stretched between said pulley members in the form of an endless loop having first and second linear segments which lie in parallel;
   means for coupling said first finger to the first linear segment of said belt member;
   means for coupling said second finger to the second linear segment of said belt member; and
   driving member means for rotating said belt member, said driving member means being operatively connected to one of the first and second linear segments, wherein said driving member means comprises
   a cylinder having two end walls, said cylinder being connected to one of said first and second linear segments of said belt member,
   a piston having two sides disposed within said cylinder,
   first and second piston rods each having one end fixedly secured to said piston on either side thereof, the other ends of said first and second piston rods passing hermetically through both end walls of said cylinder and being fixedly secured outside of said cylinder such that said first and second piston rods will not move, and
   means for moving said cylinder by introducing a fluid into said cylinder, thereby to move said first and second fingers.

2. A workpiece manipulator according to claim 1, wherein said means mounting said first and second fingers comprises a guide member for guiding said first and second fingers in a direction which is parallel to said first and second linear segments of said belt member.

3. A workpiece manipulator according to claim 1, wherein said belt member comprises a chain connected in the form of an endless loop, and each of said pulley members comprises a sprocket.

4. A workpiece manipulator according to claim 1, wherein said belt member comprises a belt connected in the form of an endless loop, and each of said pulley members comprises a pulley.

5. A workpiece manipulator according to claim 1, wherein said belt member comprises a wire connected in the form of an endless loop, and each of said pulley members comprises a pulley.

* * * * *

UNITED STATES PATENT AND TRADEMARK OFFICE
CERTIFICATE OF CORRECTION

PATENT NO. : 4,336,926
DATED : June 29, 1982
INVENTOR(S) : Inagaki et al

It is certified that error appears in the above-identified patent and that said Letters Patent is hereby corrected as shown below:

Col. 1, line 45, "the" should be --be--;

Col. 1, line 48, "there between" should be --therebetween--.

Signed and Sealed this

Twenty-second Day of February 1983

[SEAL]

Attest:

GERALD J. MOSSINGHOFF

Attesting Officer     Commissioner of Patents and Trademarks